US005708202A

United States Patent [19]

Augustin et al.

[11] Patent Number: 5,708,202

[45] Date of Patent: Jan. 13, 1998

[54] METHOD OF RECOGNIZING OPERATING ERRORS IN A FUEL INJECTION SYSTEM OF AN INTERNAL COMBUSTION ENGINE

[75] Inventors: Ulrich Augustin, Kernen; Volker Schwarz, Weinstadt, both of Germany

[73] Assignee: Mercedes-Benz AG, Stuttgart, Germany

[21] Appl. No.: 659,680

[22] Filed: Jun. 5, 1996

[30] Foreign Application Priority Data

Jun. 15, 1995 [DE] Germany ........................ 195 21 791.8

[51] Int. Cl.[6] ............................ F02M 1/00; G01M 15/00

[52] U.S. Cl. ............................................ 73/119 A; 73/115

[58] Field of Search .......................... 73/115, 116, 117.2, 73/117.3, 118.1, 714, 756, 35.12, 744, 119 A

[56] References Cited

U.S. PATENT DOCUMENTS 4,714,998 12/1987 Bussey et al. ........................ 73/119 A
4,977,872 12/1990 Hartopp et al. ........................ 73/119 A
5,020,362 6/1991 Hart et al. ............................ 73/119 A
5,107,700 4/1992 Kuttner et al. ........................ 73/119 A
5,445,019 8/1995 Glidewell et al. .................... 73/119 A
5,492,099 2/1996 Maddock ............................. 73/119 A

FOREIGN PATENT DOCUMENTS 0 501 459 9/1992 European Pat. Off. .
M-1401 4/1993 Japan .

OTHER PUBLICATIONS

Werner Banzhaf et al, "Prüfung von Einspritzdüsen für Dieselmotoren", BOSCH TECHN. BERICHTE, 1986, pp. 198–204.

*Primary Examiner*—George M. Dombroske
*Attorney, Agent, or Firm*—Klaus J. Bach

[57] ABSTRACT

In a method of recognizing operating errors in the fuel injection system of an internal combustion engine wherein fuel is supplied by a fuel pump via a common fuel supply line to a number of fuel injectors, the fuel pressure in the common fuel supply line is determined at least at two predetermined points in time between which the pressure should not change when the system is properly operating and an operating error is indicated if a difference in pressure is determined which exceeds a predetermined threshold value.

6 Claims, 3 Drawing Sheets

METHOD OF RECOGNIZING OPERATING ERRORS IN A FUEL INJECTION SYSTEM OF AN INTERNAL COMBUSTION ENGINE

BACKGROUND OF THE INVENTION

The invention resides in a method of recognizing operating errors in the fuel injection system of an internal combustion engine wherein fuel is supplied by a fuel pump to a pressurized fuel supply line from where it is then admitted to the injectors of the various cylinders of the engine.

EP 0 501 459 A2 discloses a method wherein fuel is supplied by a high pressure pump under high pressure to a supply line (common rail) commonly provided for all the injectors. This injection system includes means for determining operating problems whereby for example defective high pressure pumps can be identified. In this case, the injection system including its components such as injectors, common supply line, check valve and injector lines extending between the common supply line and the injectors, is constantly maintained under the high fuel pressure. Operating errors which may, for example, be the result of leakage in any of those components would lead to a high fuel loss. They may prevent the establishment of the proper fuel pressure in the fuel supply line. This would result in improper fuel injection and engine operating problems which could lead to total engine failure if not timely recognized.

It is therefore the principal object of the invention to provide measures by which leakage of components of the fuel injection system can be clearly and timely recognized.

SUMMARY OF THE INVENTION

In a method of recognizing operating errors in the fuel injection system of an internal combustion engine wherein fuel is supplied by a fuel pump via a common fuel supply line to a number of fuel injectors, the fuel pressure in the common fuel supply line is determined at least at two predetermined points in time between which the pressure should not change when the system is properly operating and an operating error is indicated if a difference in pressure is determined which exceeds a predetermined threshold value.

With the method steps according to the invention wherein in one block, that is, between the end of the injection procedure and the start of pump delivery or in the other block, that is, between the end of pump delivery and the start of injection, the pressure is determined at two points of time of a particular block, and if the difference between the pressures so determined exceeds a predetermined threshold, a relatively large leak is indicated. The determination of large leaks is particularly suitable for injection systems known as common rail systems. In these systems, the pressure in the high pressure storage that is in the common supply line for all the electromagnetically controlled injectors constantly changes during normal, that is problem-free operation because of the various procedures such as pump delivery and fuel injection. Each fuel injection step results in a rapid pressure loss is compensated for by the subsequent delivery of the high pressure pump. An additional pressure loss caused by a leak is consequently recognized by the special process steps and is indicated.

The determination of the pressure curve however is difficult if the fuel volume flow between the pressure pump and the injectors is small. In that case, the system pressure is influenced to a great degree by reflection waves.

By shutting down one or several cylinders during operation of the internal combustion engine wherein at least one of the successive injections and fuel deliveries is eliminated, it becomes possible to perform accurate measurements for determining leakage even if the feed delivery volume is small.

However, it may be difficult to determine the pressure curve if small leakages are present between the pressure pump and the injectors. The system pressure control would tend to compensate for small leakages by increasing the fuel delivery of the pump.

Nevertheless, small leakage can easily be determined if the determination is made when no power is asked for, that is, when a vehicle decelerates upon taking the foot from the gas pedal or the vehicle is moving downhill. Then, the fuel delivery of the injection pump is zero and the pressure can be determined at least at two different points of time ($t_1$, $t_2$ or $t_1'$, $t_2'$} and a problem can be indicated if the pressure difference exceeds a predetermined value.

The invention is described below in greater detail with reference to the drawings.

DESCRIPTION OF A PREFERRED EMBODIMENT

Figure 1:
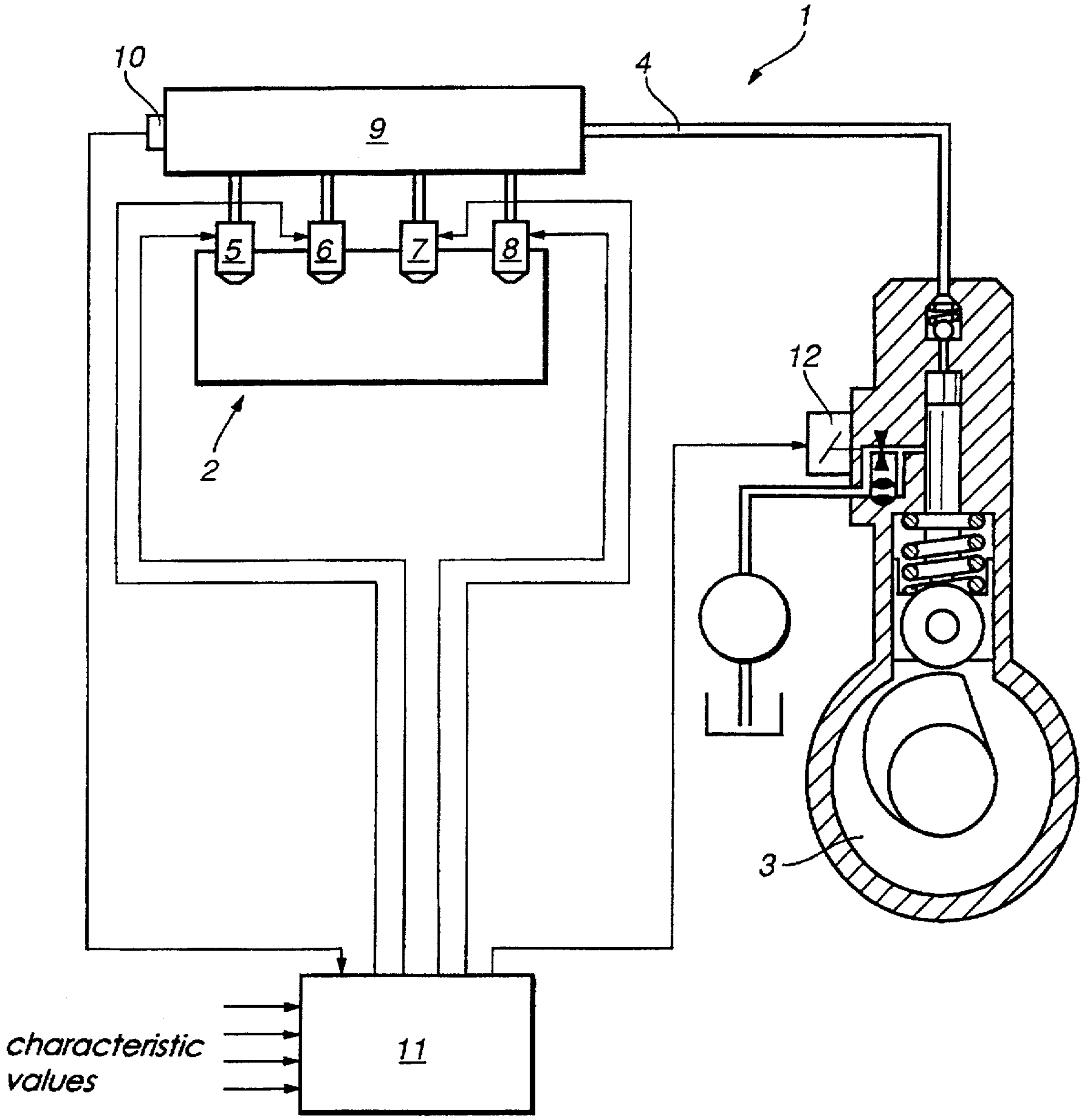
FIG. 1 shows a fuel injection system with a pressurized fuel supply line which is a common high pressure supply line for all the electromagnetically operated nozzles or injectors.

FIG. 1 shows a fuel injection system 1 of a multicylinder internal combustion engine 2, which consists essentially of a requirement controlled high pressure pump 3 and an injection line system 4 with a common high pressure supply line 9 for all the nozzles or injectors 5, 6, 7, 8.

A pressure sensor indicated by the reference numeral 10 senses the actual pressure in the high pressure supply line 9. Deviations from the desired pressure in the respective operating range are accommodated by an electronic control unit 11 by adjusting a control member 12 on the high pressure pump 3 which provides for the predetermined pressure.

The pressure sensor 10 permits only to adjust the high pressure control system for maintaining a predetermined pressure level but it is also utilized for determining leaks in the high pressure fuel line system as will be explained below in greater detail.

Figure 2:
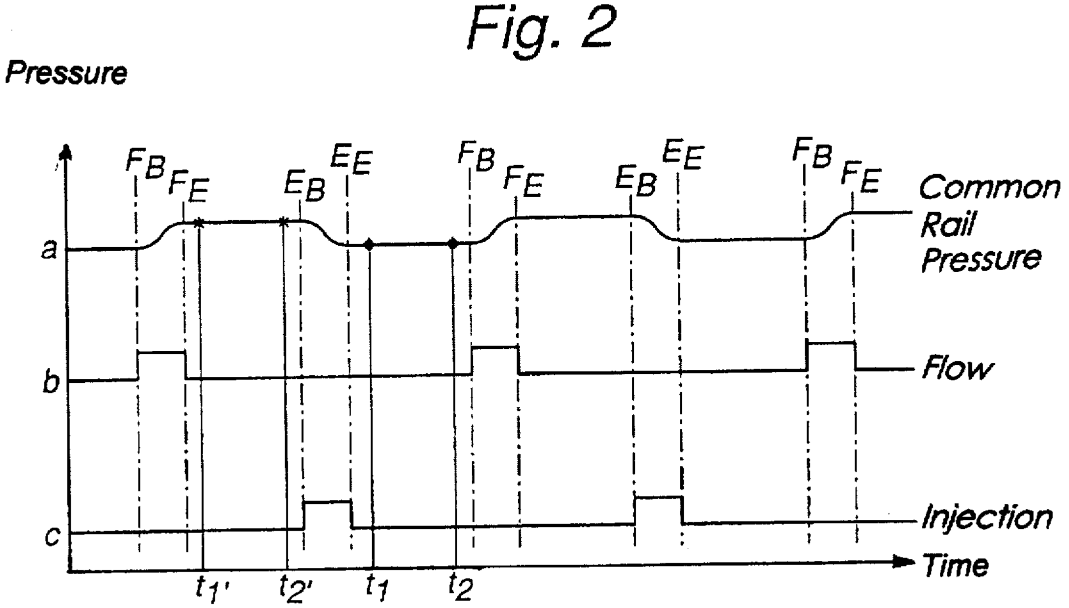
FIG. 2 shows, in a diagram, the synchronous pressure curve for fuel delivery and injection.

FIG. 2 shows phase synchronous curves a, b, c with regard to supply line pressure, the pump delivery and the fuel injection. The curves as shown represent normal, that is, leak-free operation of the engine injection system. The designations are:

$F_B$=delivery start $F_E$=delivery end $E_B$=injection start $E_E$=injection end $t_1$=first point in time $t_2$=second point in time for measuring the pressure (after the injection phase)

$t_1$'=first point in time, $t_2$'=second point in time for measuring the pressure (after the delivery phase)

Figure 3:
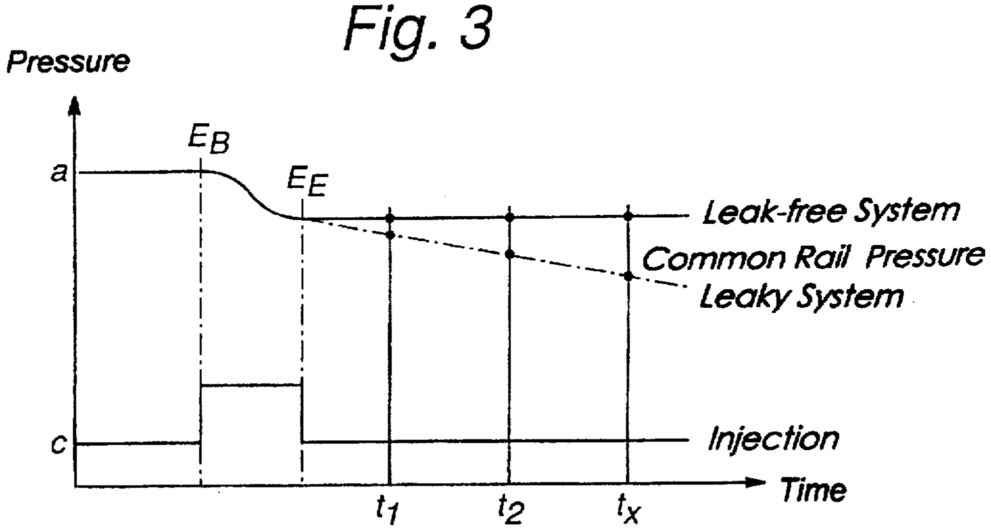
FIG. 3 is an enlarged representation showing the pressure curve for a problem-free and for a leaking system, each while the engine is operating.

The pressure sensor 10 measures the respective pressure at the predetermined points in time $t_1$ and $t_2$. Both points in time are selected to be between the injection end $E_e$ and the delivery start $E_B$. If the fuel line system is fault-free, that is, if the fuel line system has no leaks, the pressure curve is a straight line as shown in FIG. 3. There is no noticeable pressure difference between the pressures measured at the times $t_1$ and $t_2$ and, if applicable, $t_x$.

If the system has a leak, the pressure curve is represented by the sloped dash-dotted line.

If the pressure difference determined at different points in time exceeds a predetermined limit, a trouble indication is given.

This method, which can be utilized for recognizing relatively large leaks is particularly suitable for fuel line systems with relatively large fuel volume flows between the high pressure pump and the injectors.

The determination of the pressure curve for small volumes, however, is more difficult because reflections greatly influence the system pressure.

For this case, a method is provided wherein, during normal engine operation, at least one fuel delivery and at least one fuel injection step is eliminated.

Figure 4:
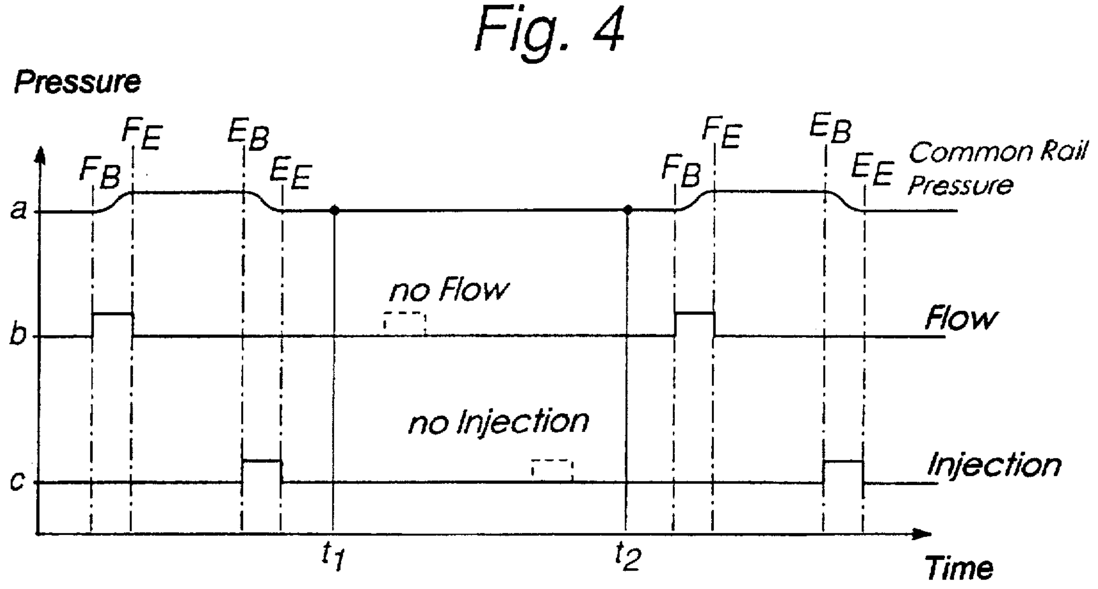
FIG. 4 is an enlarged representation showing the pressure curve for a problem-free and for a leaking system, each while the engine is operating, but without fuel delivery and fuel injection.

FIG. 4 shows the points in time $t_1$ and $t_2$ (there may be more such points) for determining the momentary pressure and the fuel delivery and the injection pressure curve when the fuel delivery and injection are temporarily shut off.

The fuel pressure curves for a leak free system and for a leaking system are similar to those shown in FIG. 3.

If there are no leaks in the system between the high pressure pump and the injectors, then a method is utilized which can be applied only while the engine is driven. With each changeover from normal operation to such driven operation, which can be recognized from a gas pedal signal, the high pressure pump is turned off in addition to the injectors which are turned off during such operation anyway.

Figure 5:
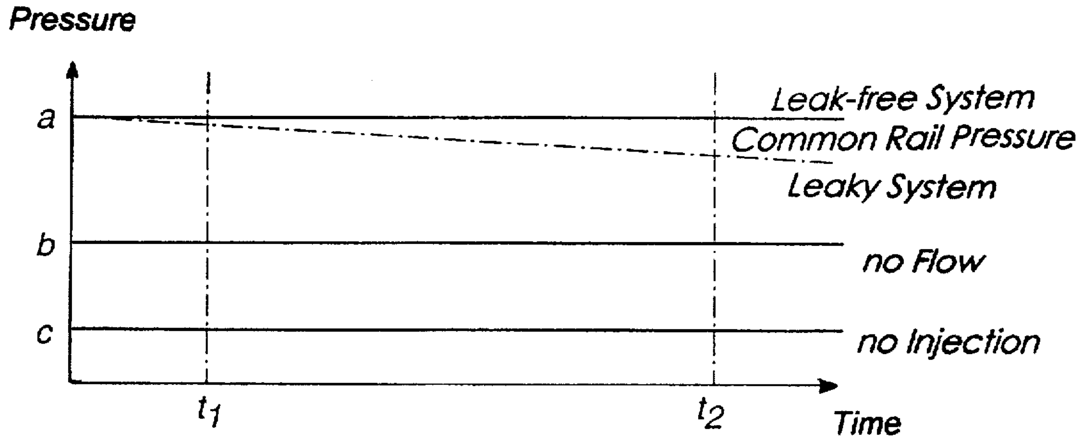
FIG. 5 shows the pressure curve of a leaking system when the engine is maintained running with fuel delivery and injection turned off.

FIG. 5 shows the points in time $t_1$ and $t_2$ for measuring the fuel pressure in the distribution line during such driven operation of the engine and it shows the pressure curve for a leak free system and a system with a leak (dash-dotted line).

The point in time $t_1$ for determining the fuel distribution line pressure can be chosen at the earliest to fall within the second revolution of the crank shaft after transition to driven operation. The first revolution of the crankshaft after transition may be utilized for the quieting down of the pressure waves in the system. The fuel distribution line pressure is measured at different points in time, for example, within ten revolutions of the crankshaft. From the measurements, the pressure loss rate is determined and a defect is indicated if a certain threshold value is exceeded.

The points in time at which the pressure is determined may be so selected that the pressure is at a higher level, that is, between the delivery end $F_E$ and the injection start $E_B$. The points in time are indicated in FIG. 2 by $t_1$' and $t_2$' for an exemplary procedure.

In the same way, the points of time $t_1$' and $t_2$' could be chosen for the other embodiments.

What is claimed is:

1. A method of recognizing operating errors in a fuel injection system of an internal combustion engine during normal engine operation wherein fuel is supplied by a fuel pump to a common fuel supply line and from the fuel supply line to injectors associated with cylinders of the internal combustion engine for injection into the cylinders, said method comprising the steps of:

determining while the engine operation the fuel pressure in said common fuel supply line at least at two predetermined points in time between the end of an injection and the start of a fuel delivery or between the end of fuel delivery and the start of an injection of said system, determining the difference in pressure measured at said two predetermined points in time and indicating an operating error if said difference exceeds a predetermined threshold value.

2. A method of recognizing operating errors in a fuel injection system of an internal combustion engine during normal engine operation wherein fuel is supplied by a fuel pump to a fuel supply line and from the fuel supply line to injectors associated with cylinders of the internal combustion engine for injection into the cylinders, said method comprising the steps of:

switching off momentarily, during normal engine operation, at least one of successive fuel injections and fuel deliveries for at least one cylinder, determining the fuel pressure in said common fuel supply line, at least at two predetermined points in time while fuel injection and deliveries are switched off determining the difference in pressures measured at said two points in time, and indicating an operating error if said difference exceeds a predetermined threshold value.

3. A method of recognizing operating errors in a fuel injection system of a motor vehicle internal combustion engine during normal engine operation wherein fuel is supplied by a fuel pump to a fuel supply line and from the fuel supply line to injectors associated with cylinders of the internal combustion engine for injection into the cylinders, said method comprising the steps of:

determining, at least at two predetermined points in time when the engine is in a driven state while the injectors and the fuel pump are shut off, the fuel pressure present in said common fuel supply line, and indicating an operating error if there is a difference in the fuel pressure determined at said points in time in excess of a predetermined threshold value.

4. A method according to claim 3, wherein said points in time are spaced by at least one revolution of the crankshaft.

5. A method according to claim 4, wherein said points in time are within ten revolutions of the crankshaft.

6. A method according to claim 3, wherein said predetermined points in time for determining the fuel pressure are after completion of the first revolution of the crankshaft after switch-over of the engine to a driven state.

* * * * *